S. SHAPIRO.
AERATING COVER FOR MILK CANS AND THE LIKE.
APPLICATION FILED SEPT. 30, 1909.
951,152. Patented Mar. 8, 1910.
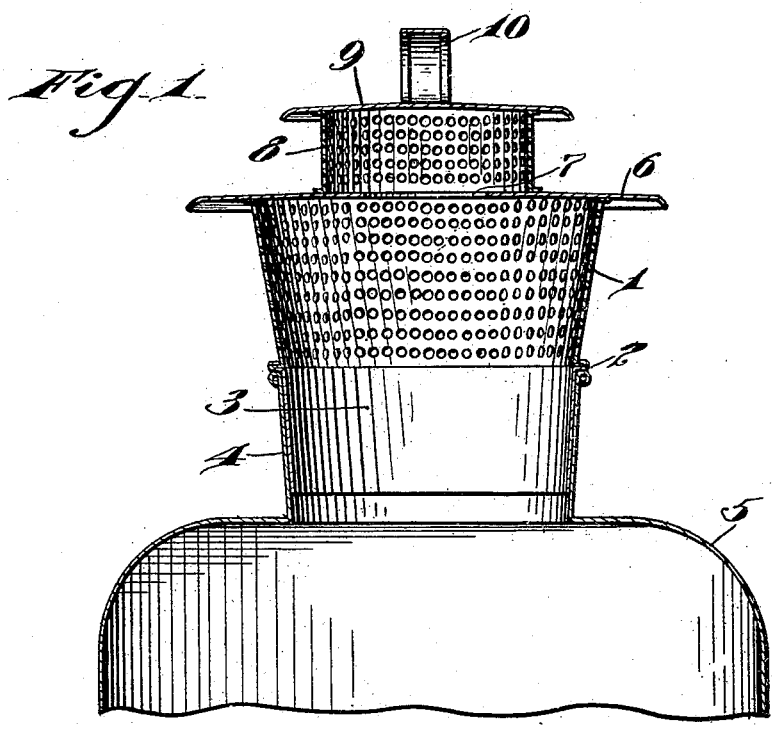
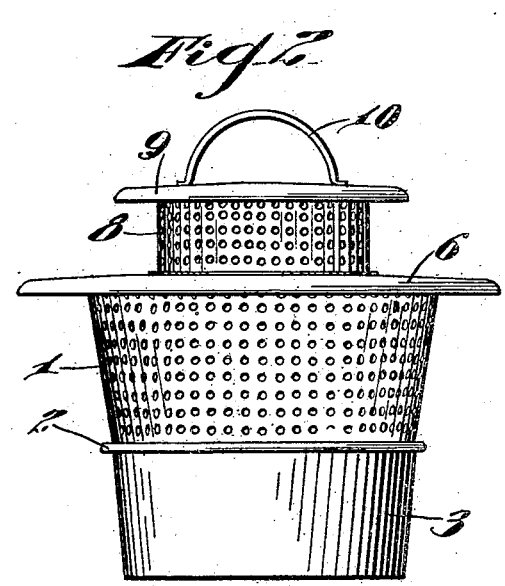
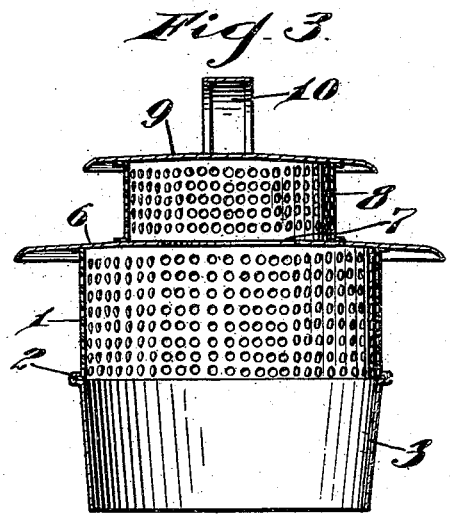
Witnesses
Theo. Risemann
R. H. Kunkel
Inventor
Samuel Shapiro,
By Joshua R H Potts,
Attorney

UNITED STATES PATENT OFFICE.

SAMUEL SHAPIRO, OF PHILADELPHIA, PENNSYLVANIA.

AERATING-COVER FOR MILK-CANS AND THE LIKE.

951,152.  Specification of Letters Patent.  Patented Mar. 8, 1910.

Application filed September 30, 1909. Serial No. 520,323.

*To all whom it may concern:*

Be it known that I, SAMUEL SHAPIRO, a citizen of the United States, residing at Philadelphia, in the county of Philadelphia and State of Pennsylvania, have invented certain new and useful Improvements in Aerating-Covers for Milk-Cans and the Like, of which the following is a specification.

My invention relates to improvements in aerating covers for milk cans and the like, the object of the invention being to provide a cover which is designed for use upon cans containing milk while the cans are standing awaiting shipment, and which cover permits a free circulation of air through the cover, so as to carry off the animal gases and odors from the milk, thoroughly aerating the latter, and at the same time preventing any entrance of flies, insects and the like into the milk.

Heretofore it has been the almost uniform practice after cans are filled with milk freshly milked from the cows to place the ordinary cover over the top of the milk can, with the cover at an angle, so as to leave an opening for the animal gases to escape. With the cover in this position, flies, insects of all kinds, and sometimes mice and larger animals find their way into the milk, and the aerating by such crude means is not satisfactory. With my improved structure the can is completely closed so far as the entrance of flies and the like is concerned, and a free circulation of air through the cover is permitted to carry off the gases.

The invention consists in certain novel features of construction, and combinations, and arrangements of parts as will be more fully hereinafter described and pointed out in the claim.

In the accompanying drawings, Figure 1, is a view in vertical section illustrating the application of one form of my improvements to a milk can. Fig. 2, is a view in elevation of this form of cover removed, and Fig. 3, is a view in vertical section of a slightly modified form of cover.

My improved aerating cover comprises a main body portion 1, which may be conical or sloping as shown in Figs. 1 and 2, or may be cylindrical as shown in Fig. 3. This body portion 1 is perforated throughout, the perforations being of a size which will permit a free circulation of air, but which will exclude flies and other insects which are liable to attack the milk. The lower end of this body portion 1 is secured by a metal seam 2, to a collar or band 3, which is adapted to fit within the neck 4 of an ordinary milk can 5, and form a tight juncture with the can top, the seam portion 2 serving to limit the downward movement of the cover.

The upper end of body portion 1 is secured to a circular plate 6, which latter has a general downward slope from its central point to its outer edge, so as to shed water, and projects over the body portion an appreciable distance as clearly shown. This plate 6 is made with a central opening 7, and a cylindrical dome 8 is secured on top of plate 6, and is of a diameter appreciably greater than the diameter of opening 7. This dome portion 8 is perforated throughout, as is the body portion 1, and is closed by a plate or cover 9, which has a downward slope from its center to its outer edge to shed water, and overlaps the dome portion 8 an appreciable distance as shown, and has a handle 10 secured thereon.

The juncture between the body portion 1, dome 8 and the plates 6 and 9, may of course be made in various ways, but I prefer to use solder to permanently secure the parts.

In operation, after the can is filled with fresh milk from the cows, my improved cover is placed on the can, the currents of air will pass in a horizontal line through the perforations in the body portion 1, and through the perforations in the dome portion 8, so that while a greater portion of the animal gases will be carried out through the perforations in body portion 1, a small portion of animal gases will find its way through opening 7 into the dome 8, and will be carried out by the air currents through the dome.

As above stated, the opening 7 is of appreciably less diameter than is the dome 8, this is to prevent as far as possible currents of air from passing into the body portion 1, thence up through the opening 7 and through the dome 8, but compelling as far as possible, the currents of air to pass in horizontal lines through the body portion 1 and through the dome 8, but this opening is necessary, so that the animal gases that may not be carried out by the currents through the body portion 1, will enter the dome 8 and be carried out by the air currents through the dome.

While I prefer the general conical form of the body portion as shown in Fig. 1, as it gives a wider and larger area to the body portion, I do not limit myself to this form, as it may be made perfectly cylindrical as shown in Fig. 3, and I do not restrict myself to the precise details set forth, but consider myself at liberty to make such changes and alterations as fairly fall within the spirit and scope of the claim.

Having thus described my invention what I claim as new and desire to secure by Letters Patent is:

An aerating cover for milk cans and the like, comprising a perforated body portion, a collar or band secured to the lower end of said body portion, and adapted to fit within the neck of a can, a cover secured on said body portion and having an opening therein, a perforated dome secured on top of said cover, and of a diameter appreciably greater than the diameter of said opening, a cover on said dome, a handle on said last mentioned cover, said last mentioned cover of a diameter greater than the diameter of the dome and overlapping the dome all around the same, and said cover of the body portion of a diameter appreciably greater than the diameter of the body portion and overlapping the body portion all around its edges, and both of said covers having a downward inclination from their center to their edges, substantially as and for the purpose set forth.

In testimony whereof I have signed my name to this specification in the presence of two subscribing witnesses.

SAMUEL SHAPIRO.

Witnesses:
 EMMA WEBER,
 R. H. KRENKEL.